United States Patent [19]

Inoue et al.

[11] Patent Number: 5,424,850
[45] Date of Patent: Jun. 13, 1995

[54] METHOD AND APPARATUS FOR RECORDING COMPRESSED AUDIO DATA ON A VIDEO RECORD MEDIUM

[75] Inventors: Hajime Inoue, Chiba; Keiji Kanota; Yukio Kubota, both of Kanagawa, all of Japan

[73] Assignee: Sony Corporation, Tokyo, Japan

[21] Appl. No.: 899,615

[22] Filed: Jun. 16, 1992

[30] Foreign Application Priority Data

Jun. 25, 1991 [JP] Japan .................................. 3-153403

[51] Int. Cl.$^6$ ............................................. H04N 5/76
[52] U.S. Cl. ..................................... 358/341; 358/343; 358/342; 358/335; 360/33.1
[58] Field of Search ............... 358/341, 343, 342, 335, 358/31; 360/19.1, 33.1, 5, 13; H04N 5/76, 5/782, 5/781

[56] References Cited

U.S. PATENT DOCUMENTS 5,121,259 6/1992 Yamashita ............................ 358/343
5,130,812 7/1992 Yamaoka ............................. 358/341

Primary Examiner—Howard W. Britton
Assistant Examiner—Khoi Truong
Attorney, Agent, or Firm—William S. Frommer; Alvin Sinderbrand

[57] ABSTRACT

Video and audio data are recorded onto video and audio signal recording areas of a track of a record medium, these areas being included either in one of several segments in the track or the track being comprised of only a single segment of video and audio signal recording areas. Audio data that is supplied at substantially the same time as the video data is compressed and recorded in a first audio sector of the audio signal recording area. Then, depending upon whether a first or second audio signal recording mode is selected, either compressed audio data which is derived from the audio data supplied at substantially the same time as the video data or independent compressed audio data is provided. The derived or independent compressed audio data is recorded in a second audio sector of the audio signal recording area.

42 Claims, 8 Drawing Sheets

METHOD AND APPARATUS FOR RECORDING COMPRESSED AUDIO DATA ON A VIDEO RECORD MEDIUM

BACKGROUND OF THE INVENTION

This invention relates to video signal recording and, more particularly, to a method and apparatus for recording compressed audio data along with the video data on a record medium, such as a digital video tape.

Digital signal recording apparatus, such as digital video tape recorders (DVTR) have been developed for broadcasting purposes because of the excellent quality in video pictures that are reproduced therefrom. Heretofore, the emphasis of such digital video recording systems has been on enhancing the video picture. Typically, analog video signals are digitized by sampling the analog signal and converting each sample to an 8-bit digital signal. Maximum video information is retained by recording the 8-bit video samples in uncompressed form. Consequently, a substantial amount of record medium is needed to record video programs of even minimal broadcasting length, such as thirty minute programs.

DVTR systems have been developed with two distinct formats: the so-called component type digital recorder, known as the D-1 format, and the so-called composite type digital recorder, known as the D-2 format. When recording digital video signals on video tape using the D-1 format, an audio recording sector is provided in the middle of a track and is preceded and followed by video recording sectors. Up to four channels of audio information may be recorded in the audio sector. By providing the audio sector in the middle of the track, it is expected that the usual scanning heads will exhibit stable track following, or tracking control, by the time those heads reach the middle of the track during normal as well as special effect scanning speeds. It has been found that small scanning errors that may be present when the video sectors are scanned may be more easily corrected and are less perceptible to a human observer than if those same small scanning errors are present when audio information is scanned. By locating the audio information in the middle of a track, such small scanning errors that may be present when audio information is reproduced are minimized.

When video and audio information are recorded in the D-2 format, the audio information is recorded in audio sectors that precede and follow the video sector. The video sector is, of course, substantially larger than each of the audio sectors, and two channels of audio information may be recorded in each audio sector. Thus, a total of four channels of audio information may be recorded in the D-2 format, with two channels of audio information preceding the video sector and two channels of audio information following the video sector. The track length of the D-2 format is shorter than the track length of the D-1 format by approximately 13%. As a result of this shorter track length, tracking control errors are minimized over the entire length of the track and, thus, the flanking audio sectors are scanned quite stably even when different tape speeds are used to effect different reproducing modes (e.g. normal, slow speed, high speed and special effects modes).

The four-channel audio recording capability of the D-1 and D-2 formats facilitates the recording of audio information with high quality. If audio information normally is recorded as two-channel audio data (e.g. left and right audio channels), then the same two-channel audio data may be recorded twice so as to be recorded as four-channel audio data. Such redundant recording is most helpful in overcoming or correcting errors that otherwise would result from drop-out in one or the other pairs of audio channels. Four-channel audio recording also facilitates a technique known as "after-recording" in which audio information 6 that is produced at a later time (i.e. subsequent to the recording of video information) may be recorded. For example, when audio information is edited or when audio information is translated into a different language, such edited or translated audio data usually is provided at a time that is substantially delayed from the time that the video information is recorded. Nevertheless, this after-recorded audio data is recorded quite easily in two of the four audio channels that are available for recording.

As mentioned above, digital video recording for broadcasting purposes is accomplished without compression of the video or audio data. While this assures a high quality of video information, the fact that the video data is uncompressed means that a substantial amount of record medium must be used to accommodate such uncompressed video data. Since video tapes must be of finite length, the need for more record medium to record uncompressed video data results in a shorter overall recording time. This inefficient use of video tape is an acceptable trade-off for broadcasting purposes but is not acceptable for consumer use. A desirable objective of video tape recording is the capability of recording a broadcasted program in the user's absence. Since a consumer may use his video recorder to record several programs, it is important that commercially available "blank" magnetic tape (such as in cassette form) be of sufficient length to record the many programs that the user otherwise may miss. Hence, for consumer use, a desirable objective is to record video and audio data on a single record medium over a long period of time.

To accommodate long recording periods, digital video recorders for consumer use have been developed to record a channel of audio data at a sampling rate of 48 KHz, with each audio sample being digitized as a 16-bit sample. Such consumer-type digital video recorders typically are capable of recording only two audio channels; and, as a result, if errors are present in the recorded audio information, it is difficult to correct such errors. Thus, it is difficult to obtain high quality audio recording in such two-channel consumer-type video recorders. Furthermore, the typical consumer-type two-channel audio recording capability does not easily permit the after-recording of audio information.

OBJECTS OF THE INVENTION

Therefore, it is an object of the present invention to provide an improved video recorder that is particularly adapted for consumer use and which permits high quality as well as after-recording of audio information.

Another object of this invention is to provide a digital video recorder that is particularly adapted to record long periods of video programs while permitting audio information to be recorded with high quality as well as at a time subsequent to the recording of the video information.

A further object of this invention is to provide an improved method and apparatus for recording video and audio data onto video and audio signal recording areas of a track of a record medium, which overcome the aforenoted drawbacks and disadvantages of the prior art, and which are particularly adapted for consumer use.

An additional object of this invention is to provide a technique for recording four channels of compressed audio data on the same record medium as are recorded video data, with the four channels being used either for recording audio information with high quality or for permitting the after-recording of audio data.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus for recording audio data together with video data onto audio and video signal recording areas of a track of a record medium are provided. Input audio data that is supplied at substantially the same time as the video data is compressed and recorded in a first audio sector. Depending upon whether a first or a second audio signal recording mode is selected, either compressed audio data that is derived from the input audio data or independent compressed audio data is provided and recorded in a second audio sector.

The audio and video signal recording areas may be included in one of a plurality of recording segments in a track or, alternatively, these recording areas may comprise the only audio and video areas in the track.

As one aspect of this invention, the compressed audio data which is derived from the input audio data is provided by determining an error in the compressed input audio data, and then compressing that error. As a feature of this aspect, the error in the compressed input audio data is determined by digitizing an input analog audio signal, compressing that digitized audio data, expanding the compressed, digitized audio data, converting the expanded audio data to analog form, determining a difference between the converted analog audio data and the input analog audio data, and digitizing the determined difference.

As another embodiment for determining an error in the compressed input audio data, said compressed input audio data is expanded and a difference between that expanded audio data and the digitized input analog audio signal is determined.

As yet another aspect of this invention, compressed audio data that is derived from the input audio data supplied at substantially the same time as the video data is provided by supplying the same compressed audio data for recording in both the first and second audio sectors, thereby recording redundant, compressed audio data in both audio sectors.

The present invention also is directed to a method and apparatus for reproducing the audio data that is recorded in the aforementioned manner in the audio sectors described above.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF PREFERRED EMBODIMENTS

Figure 1:
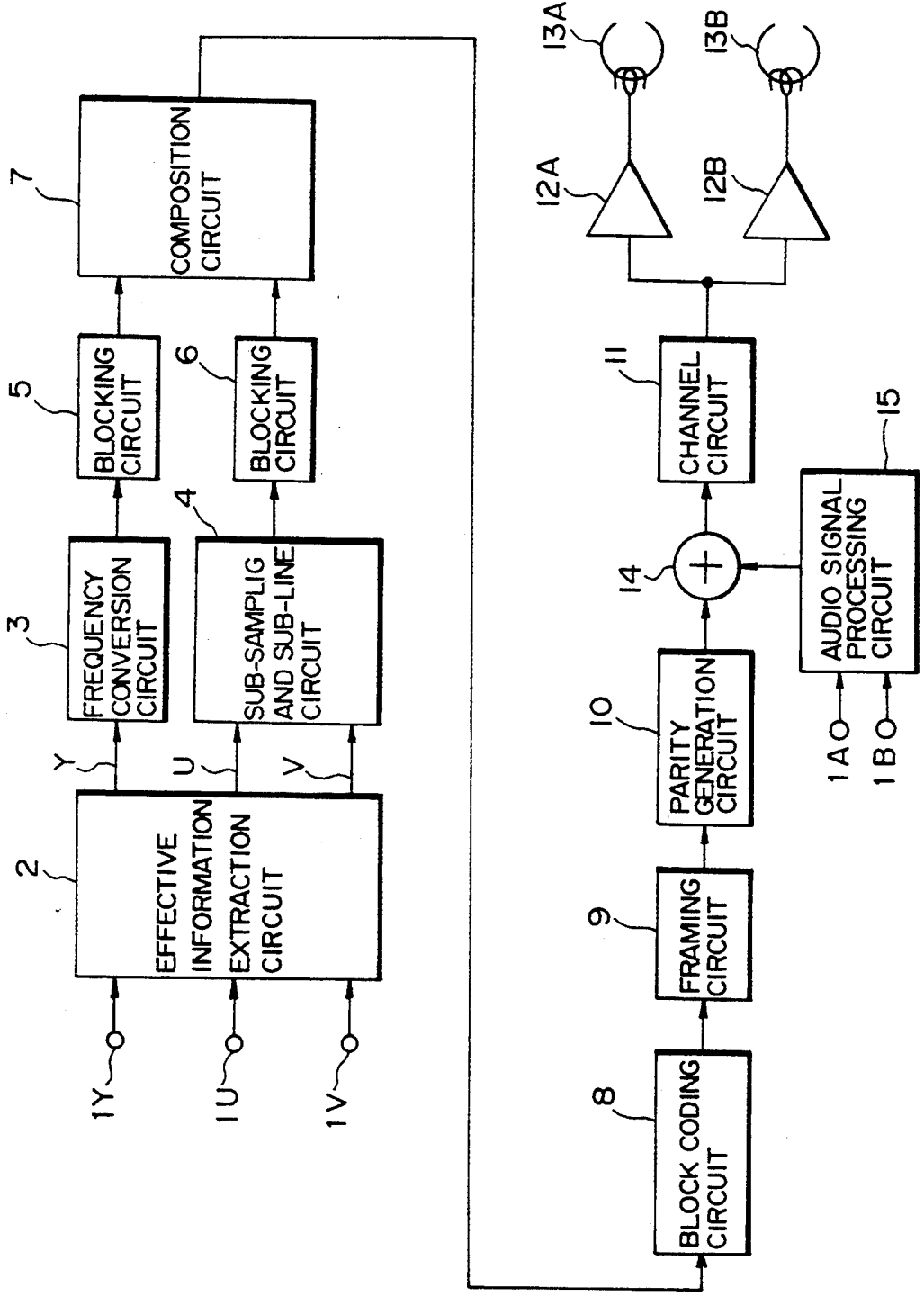
FIG. 1 is a block diagram of digital video recording apparatus in which the present invention finds ready application.

Referring now to the drawings, wherein like reference numerals are used throughout, FIG. 1 is a block diagram of digital video/audio recording apparatus in which the present invention finds ready application. As an example, the video recording apparatus shown in FIG. 1 may be used directly with a video camera and may be incorporated in the same housing therewith, such as a so-called "camcorder". Alternatively, the apparatus of FIG. 1 may be supplied with video signals recovered from broadcasted or previously recorded television signals. In any event, the illustrated apparatus is comprised of an information extractor 2, a frequency converter 3, a line sequencer 4, image block converters 5 and 6, a data compressor 8, a mixer 14, an audio processor 15 and recording heads 13a and 13b. Information extractor 2 is coupled to input terminals 1Y, 1U and 1V and is adapted to receive a digital luminance signal Y and digital color difference signals U and V, respectively. In one embodiment, the digital luminance and color difference signals are derived from the three primary color signals red, green and blue produced by a color video camera. Alternatively, the digital luminance and color difference signals are derived from reproduced television signals or from broadcasted television signals. It will be appreciated that the derivation of digital luminance and color difference signals Y, U and V and the application of these signals to information extractor 2 are conventional and further description thereof need not be provided.

The information extractor functions to extract useful luminance and color difference information from the digital luminance and color difference signals supplied thereto and to discard the usual video signals which do not comprise useful video information. For example, signals that are included in line intervals which typically are not displayed on a conventional television monitor as well as various synchronizing and equalizing signals are discarded. Information extractor 2 includes output terminals to which the extracted digital luminance signal Y and the extracted digital color difference signals U and V are supplied, respectively.

Frequency converter 3 is coupled to information extractor 2 and is adapted to convert the sampling frequency, or data rate, of the digital luminance signal Y. The sampling frequency of this luminance signal may be on the order of 13.5 MHz; and the frequency converter is adapted to reduce that frequency to approximately three-fourths ($\frac{3}{4}$) of its original sampling frequency. As will be known by those of ordinary skill in the art, frequency converter 3 may be implemented by a thin-out filter that prevents aliasing noise. The frequency-converted digital luminance signal Y is supplied from frequency converter 3 to image block converter 5.

The output terminals of information extractor 2 to which the extracted digital color difference signals U and V are supplied are coupled to line sequencer 4. The line sequencer is adapted to reduce the sampling frequency, or data rate, of each of the digital color difference signals U and V to one-half ($\frac{1}{2}$) of its original sampling frequency and to select alternate ones of these frequency-reduced color difference signals on a line-by-line basis. For example, one line of the frequency-reduced digital color difference signal U is followed by the next line of the frequency-reduced color difference signal V. Thus, line-sequential, frequency-reduced digital color difference signals U and V are produced by line sequencer 4. These line sequential, frequency-reduced color difference signals are supplied to image block converter 6.

Image block converters 5 and 6 are adapted to form blocks of frequency-reduced video signals supplied thereto from frequency converter 3 and line sequencer 4, respectively. For example, a predetermined number of samples is arranged as an image block by each of these image block converters. As illustrated, image block converters 5 and 6 are coupled to a composing circuit 7 which operates to form a single channel of digital video data from the block of frequency-reduced digital luminance signals and from the block of frequency-reduced, line sequential color difference signals produced by the respective block converters. Composing circuit 7 is coupled to data compressor 8 which is adapted to compress the data included in the single channel of video information composed by the composing circuit. For example, data compressor 8 may comprise an orthogonal transform circuit, such as a discrete cosine transform circuit, or it may comprise an adaptive dynamic range coder (ADRC), or other known circuits. As a result, the amount of data needed to represent the original luminance and color difference signals is reduced.

The output of data compressor 8 is coupled to a framing circuit 9 which operates to convert the clock frequency of the data-compressed frequency-reduced luminance and color difference signals to a clock rate that is particularly compatible for recording. In addition, the framing circuit converts the block structure format produced by image block converters 5 and 6, composing circuit 7 and data compressor 8 to a frame structure data format.

Figure 3:
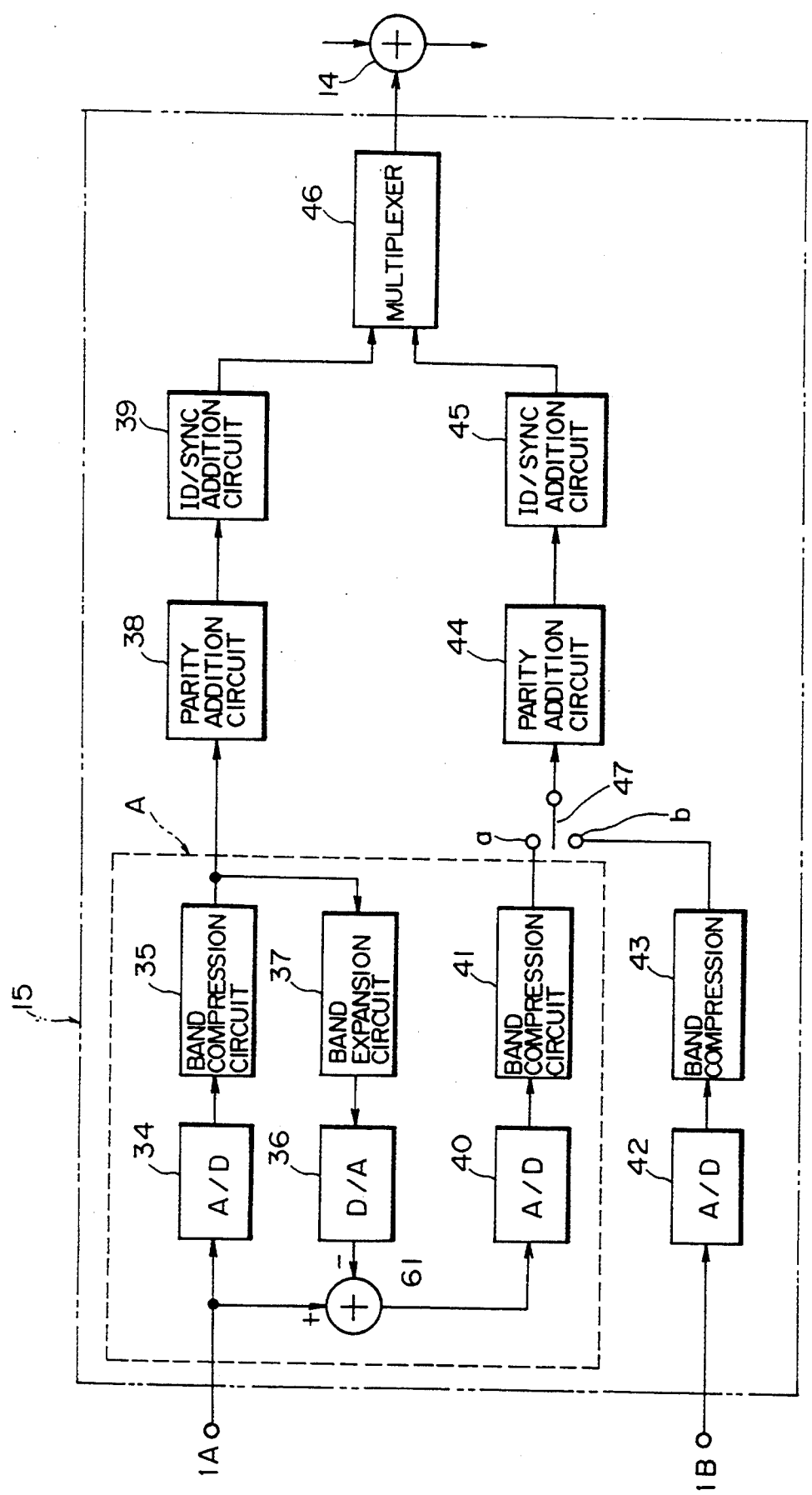
FIG. 3 is a block diagram of one embodiment of recording apparatus in accordance with the present invention.

Framing circuit 9 is coupled to mixer 14 by way of a parity generator 10. The parity generator operates in conventional manner to generate parity bits from the frames of compressed data supplied thereto by framing circuit 9, these parity bits being used for error correction purposes during a reproduction operation. Mixer 14 is supplied with compressed audio signals from audio processor 15 in a manner to be described below. One embodiment of the audio processor is illustrated in FIG. 3, and will be explained hereinafter. Suffice it to say that audio processor 15 is supplied with audio signals, such as analog audio signals, by way of input terminals 1A and 1B. In particular, the audio signals supplied to input terminal 1A preferably are comprised of two-channel audio signals (e.g. stereo signals), and these audio signals are supplied to terminal 1A at substantially the same time as video data is supplied to input terminals 1Y, 1U and 1V. As will be described, audio signals may be coupled to input terminals 1B to effect an after-recording mode of operation.

Mixer 14 serves to combine the video data supplied thereto from framing circuit 9 and parity generator 10 with audio data supplied thereto by audio processor 15 and to couple the combined, or mixed video and audio information to a channel encoder 11. The channel encoder operates to reduce the low frequency components of the video and audio data to be recorded and may encode the video and audio data in conventional manner and in accordance with typical recording codes, such as 1,7 code, MFM code, NRZI, etc. The output of channel encoder 11 is coupled to recording heads 13A and 13B by way of recording amplifiers 12A and 12B, respectively.

Figure 2:
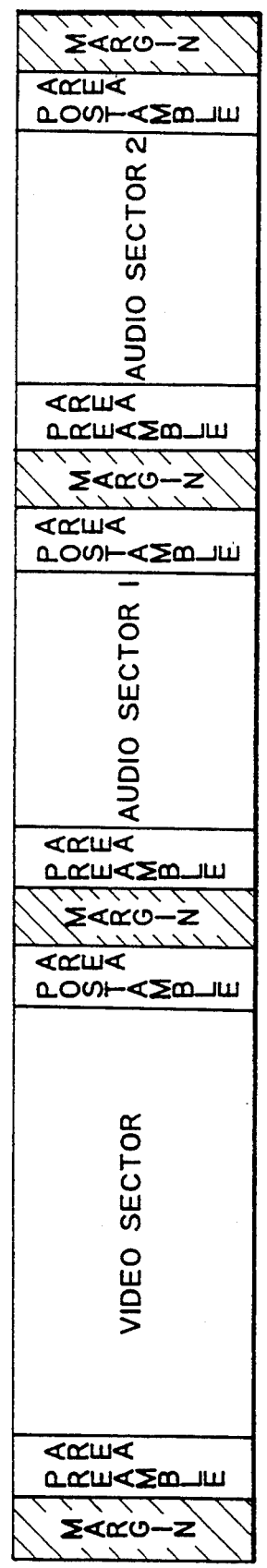
FIG. 2 is a schematic representation of a segment (or track) in which video and audio data are recorded.

The video recording apparatus illustrated in FIG. 1 may be of conventional construction known to those of ordinary skill in the art. Accordingly, in the interest of simplicity and brevity, further description of such recording apparatus is not provided. The present invention, is directed more particularly to audio processor 15; and preferred embodiments of this audio processor are described below in conjunction with, for example, FIGS. 3, 6 and 8. However, for the purpose of the present description, it should be appreciated that the mixed video and audio data provided by mixer 14 are recorded in one or more segments of a record track in accordance with the format schematically illustrated in FIG. 2. In one embodiment, a plurality of segments of the type shown in FIG. 2 are recorded in a single track on the record medium, such as a single track of video tape. In another embodiment, the segment shown in FIG. 2 comprises substantially the entire track.

As shown, a video signal recording area, identified as "video sector", is followed by two successive audio signal recording areas, identified as "audio sector 1" and "audio sector 2". It will be recognized that the video and audio sectors shown in FIG. 2 are not drawn to scale.

Preceding each sector is a preamble area and a margin area, the preamble area having data and synchronizing information recorded therein and the margin area being provided to permit change-over in the reproducing apparatus as well as to accommodate tolerances in the recording of video and audio information. Each sector is followed by a postamble area; and it is seen that adjacent sectors are separated by a region comprised of a postamble area, a margin area and a preamble area. The signals recorded in the preamble and postamble areas preferably are comprised of pulses having a repetitive frequency equal to the clock frequency (or data bit frequency) of the respective video and audio data recorded in the video and audio sectors. Alternatively, the pulse signals may exhibit a frequency that is a multiple or submultiple of such data bit frequency. The purpose of these pulse signals is to enable a phase locked loop (PLL) to lock onto the data bit frequency during a reproducing mode such that the clock frequency of the reproducing apparatus is synchronized to the clock frequency of the information being reproduced from the record medium.

One embodiment of audio processor 15 which is particularly adapted for recording four channels of audio information now will be described in conjunction with the block diagram shown in FIG. 3. This audio processor is adapted to operate in one of two different audio signal recording modes: a high quality mode, in which two-channel audio information is recorded in four channels, or an after-recording mode, in which two-channel audio information is recorded substantially simultaneously with the video information, and different two-channel audio information is recorded at a later time, subsequent to the recording of the video information, thus constituting "after-recorded" audio data. A selector switch 47 is used to select either the high quality or the after-recording mode, as will be described.

Input analog audio signals are coupled to an input terminal 1A at substantially the same time as video data is coupled to input terminals 1Y, 1U and 1V of the recording apparatus shown in FIG. 1. Input terminal 1B of FIG. 3 is adapted to receive analog audio signals at a later time, that is, after the original video and audio data are recorded. Stated otherwise, input terminal 1B is adapted to receive audio signals for after recording.

Audio processor 15 is comprised of a high quality processing section A which, in the embodiment shown in FIG. 3, is comprised of an analog-to-digital (A/D) converter 34, a compressor 35, an expander 37, a digital-to-analog (D/A) converter 36, a difference circuit 61, an A/D converter 40 and a compressor 41. The audio processor 15 also includes parity circuits 38 and 44, ID/sync circuits 39 and 45 and a multiplexer 46. Input terminal 1A is coupled to A/D converter 34 which functions to digitize the input analog audio signals supplied thereto. In one example, this audio signal is a two-channel audio signal. As mentioned above, the analog audio signal is sampled at a sampling rate of 48 KHz. In the present invention, each sample is represented by sixteen bits; and A/D converter 34 is adapted to operate at 1.536 MB/sec. to digitize two channels of audio signals supplied thereto by way of input terminal 1A (48 KHz×16 bits×2 channels=1.536 MB/sec.).

Compressor 35 is coupled to A/D converter 34 and is adapted to reduce the frequency of the digitized audio signals by half. Thus, compressor 35 operates as a band compression circuit to convert the data rate of the digitized audio information from 1.536 MB/sec. to 768 KB/sec. The compressed audio data is fed back to expander 37, to be described, and also is coupled to parity circuit 38. The parity circuit functions in conventional manner to generate parity bits and adds an error correction parity code to the compressed digitized audio data supplied from compressor 35. This audio data with an appended error correction parity code is coupled to ID/sync circuit 39 which generates identification data to identify the particular audio sector in which this audio data is recorded and also generates synchronizing data which is useful during a reproducing operation to detect the audio data. For example, the sector ID and sync data may be included in the preamble area that precedes audio sector 1, shown in FIG. 2. In this example, it will be appreciated that the sector ID data functions to identify the audio sector as "sector 1".

As mentioned above, the compressed audio data produced by compressor 35 is fed back to expander 37 which functions to return the compressed audio data to its original data rate of 1.536 MB/sec. The output of expander 37 is coupled to D/A converter 36 which re-converts the digitized audio data to analog form. The reconverted analog audio signals are coupled to difference circuit 61 whereat they are compared with the original input analog audio signals supplied to terminal 1A. Although not shown, it will be appreciated that terminal 1A may be coupled to difference circuit 61 by way of a delay circuit which functions to compensate for delays inherent in A/D converter 34, compressor 35, expander 37 and D/A converter 36. The difference circuit is adapted to determine differences which may be expected between the original input analog audio signal and the analog audio signal that has been reconverted from its digitized and compressed form. Such differences are referred to herein as an error, and this error, which appears at the output of difference circuit 61, is coupled to yet another compressor 41 by way of an A/D converter 40. The combination of A/D converter 40 and compressor 41 functions to digitize and compress the error that may be present in the originally compressed audio data produced by compressor 35. Stated otherwise, the compressed error provided by compressor 41 comprises compressed audio data that is derived from the original, compressed audio data produced by compressor 35 and that had been supplied at substantially the same time as the video data supplied to input terminals 1Y, 1U and 1V of the recording apparatus shown in FIG. 1.

The output of compressor 41 is coupled to a terminal a of selector switch 47. As mentioned above, this selector switch operates to select a first or second audio signal recording mode, these modes being described herein as the high quality and after-recording modes. When the high quality recording mode is selected, switch 47 engages its terminal a, thereby coupling compressor 41 to a parity circuit 44. This parity circuit is substantially similar to aforedescribed parity circuit 38 and is adapted to generate parity bits which may be added to the compressed error signal produced by compressor 41 as an error correction parity code. The compressed audio error data with this added error correction parity code is coupled to ID/sync circuit 45 which is similar to ID/sync circuit 39 and is adapted to generate sector identification data which identifies audio sector 2. In addition, a sync signal is generated by this ID/sync circuit for use during a reproducing operation to detect and recover the audio data recorded in audio sector 2. As will also be described, ID/sync circuit 45 also generates mode identifying data, such as high quality or after-recording ID data.

Multiplexer 46 is coupled to ID/sync circuits 39 and 45 to select either the compressed audio data supplied from compressor 35 (together with the error correction parity code and ID and sync data added thereto) or the compressed error data produced by compressor 41 (together with the error correction parity code and ID and sync data added thereto) for recording either in audio sector 1 or in audio sector 2 as heads 13A and 13B scan successive tracks across the record medium. As shown in FIG. 3, the output of multiplexer 46 is coupled to mixer 14 whereat the compressed audio signals processed by audio processor 15 are combined with digital video signals, as produced by the recording apparatus discussed above in conjunction with FIG. 1.

Selector switch 47 also may selectively engage its terminal b to receive compressed audio data for recording in the after-recording mode. As shown in FIG. 3, terminal 1B, which is adapted to receive such after-recording audio signals, is coupled to A/D converter 42 which, like A/D converter 34 operates at 1.536 MB/sec. to digitize two-channel analog audio signals supplied thereto. The digitized audio signals are coupled to compressor 43 which, like compressor 35, operates to reduce the data rate of the digitized audio signals, thus reducing the bandwidth thereof. Compressor 43 is coupled to terminal b to supply compressed, digitized audio data at the data rate of 768 KB/sec. It will be seen that, when audio processor 15 operates in its after-recording mode, selector switch 47 couples the digitized, compressed, after-recording audio data to multiplexer 46 by way of parity circuit 44 and ID/sync circuit 45 in place of the compressed audio error data that otherwise is coupled to the multiplexer during a high quality recording mode.

As mentioned above, ID/sync circuit 45 adds identification data to the compressed audio data supplied thereto by selector switch 47 to identify the particular audio sector in which this compressed audio data is recorded. In the example described herein, such sector identification data identifies audio sector 2. In addition, ID/sync circuit 45 adds mode identifying data to the compressed audio data supplied thereto. In the examples described herein, such mode identifying data serves to identify either the high quality or after-recording modes of operation.

In operation, let it be assumed that the high quality recording mode is selected. Accordingly, selector switch 47 couples the cascade connection of A/D converter 40 and compressor 41 to multiplexer 46 by way of parity circuit 44 and ID/sync circuit 45. Analog audio signals are supplied to input terminal 1A substantially simultaneously with the video signals that are supplied to input terminals 1Y, 1U and 1V of FIG. 1. The analog audio signals are digitized by A/D converter 34 and compressed by compressor 35. This compressed audio data is coupled through parity circuit 38 and ID/sync circuit 39 to multiplexer 46. The ID/sync circuit adds sector identification data to the compressed audio data, thereby identifying audio sector 1 as the sector in which this compressed audio data is recorded. When recording heads 13A, 13B scan the audio signal recording area in each track, this compressed audio data is recorded in audio sector 1.

The audio data compressed by compressor 35 is fed back to difference circuit 61 by way of expander 37 and D/A converter 36. It is appreciated that the D/A converter attempts to convert the compressed audio data to its original analog form, that is, to the form exhibited by the analog audio signals originally supplied to input terminal 1A. However, because of quantizing errors in A/D converter 34 and in D/A converter 36, as well as compression errors inherent in compressor 35, it is expected that the reconverted analog audio signals produced at the output of D/A converter 36 differ from the analog audio signals supplied to input terminal 1A. Hence, difference circuit 61 produces an error signal representing this difference; and this audio error signal is digitized by A/D converter 40 and compressed by compressor 41. The compressed error data is supplied to ID/sync circuit 45 by way of parity circuit 44. This ID/sync circuit adds identification data to the compressed error data thereby identifying audio sector 2 as the sector in which this compressed error data is recorded, and further identifying the recording mode exhibited by audio processor 15 as the high quality recording mode. Multiplexer 46 supplies the compressed error data to recording heads 13A and 13B at the time that each head scans that portion of the audio signal recording area assigned to audio sector 2. Thus, in the high quality recording mode, compressed input audio data that is supplied at substantially the same time as the video data is recorded in audio sector 1 and compressed error data derived from this compressed input audio data is recorded in audio sector 2.

If the illustrated audio processor is operated in its after-recording mode, audio signals which are supplied to input terminal 1B after the video and previously supplied audio signals had been recorded now are recorded in sector 2. It is appreciated that, in the after-recording mode, compressed audio data already is recorded in audio sector 1; and during the actual after-recording operation, no audio signals are supplied to input terminal 1A. In the after-recording mode, selector switch 47 couples the cascade connection of A/D converter 42 and compressor 43 to multiplexer 46 by way of parity circuit 44 and ID/sync circuit 45. Hence, in the after-recording mode, the audio signals now supplied to input terminal 1B are digitized and compressed, and then supplied to the multiplexer together with identification data which identifies the recording mode as the after-recording mode and also identifies the particular audio sector (that is, audio sector 2) in which this compressed audio data is recorded. It is appreciated that, in the after-recording mode, the audio data supplied to input terminal 1B and recorded in compressed form in audio sector 2 is independent audio data, that is, it is independent of the audio information originally recorded in audio sectors 1 and 2.

Figure 4:
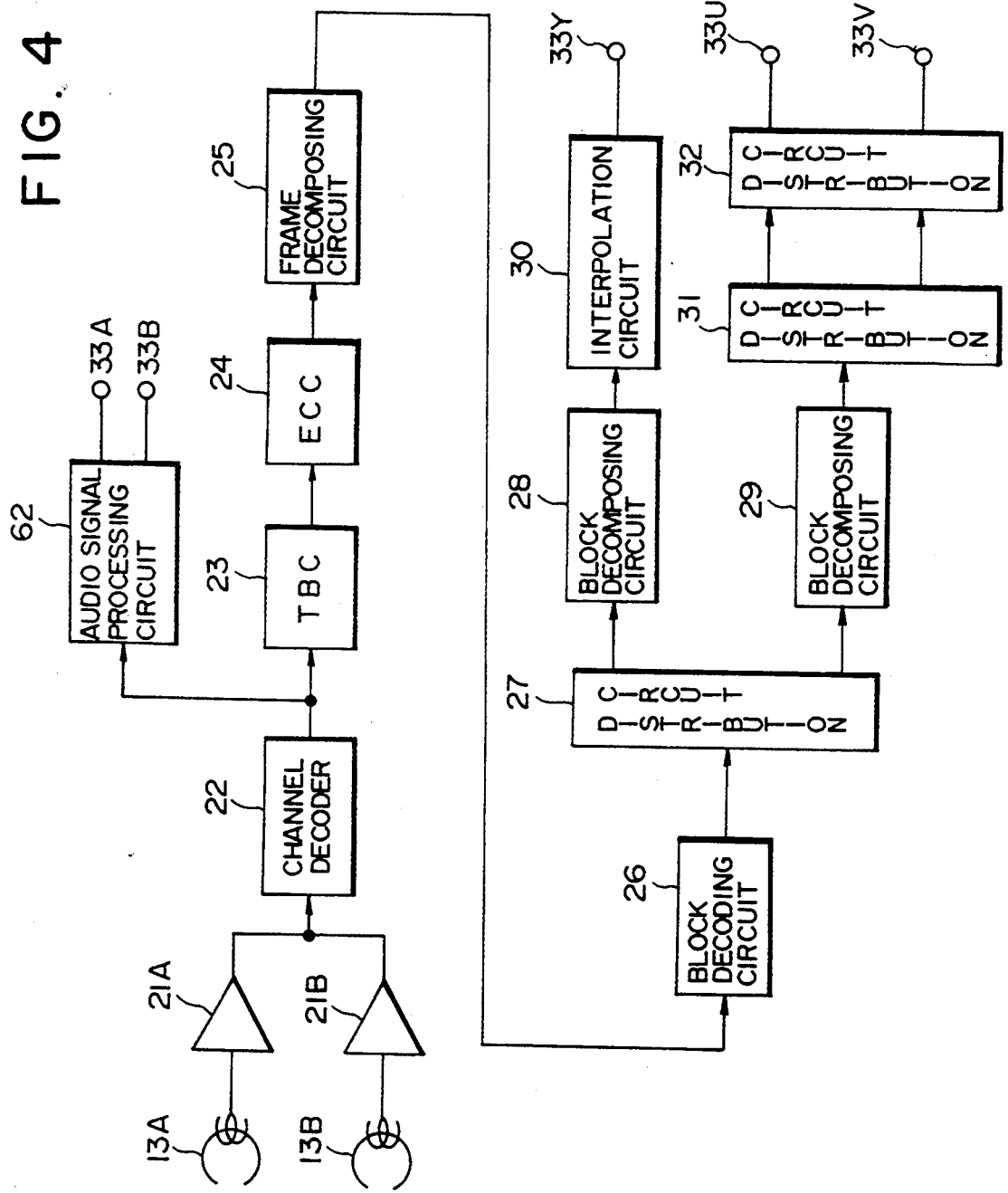
FIG. 4 is a block diagram of digital video reproducing apparatus for recovering digital audio and video information that may be recorded by the apparatus shown in FIG. 1.

Turning now to FIG. 4, there is illustrated a block diagram of apparatus adapted to reproduce the video and audio data recorded on a record medium by the apparatus shown in FIG. 1. To be consistent with the examples discussed above, it is assumed that the video and audio data are recorded in digital form on magnetic tape in the format shown in FIG. 2. It is further assumed that recording heads 13A and 13B are used to reproduce the digital and audio data from successive record tracks on the tape, and are referred to as read heads.

As shown, the reproducing apparatus of FIG. 4 is comprised of a channel decoder 22, a time base corrector 23, a block decoder 26, a distributor 27, inverse blocking circuits 28 and 29, and interpolators 30 and 32. Channel decoder 22 is adapted to decode the digital signals recorded in the form encoded by channel encoder 11. Accordingly, channel decoder 22 is compatible with channel encoder 11 and functions to recover the particular encoded format that was used for recording, such as 1,7 code, MFM code, NRZI, etc. The input of channel decoder 22 is coupled to read heads 13A and 13B by amplifiers 21A and 21B, respectively, and the output of the channel decoder is coupled to time base corrector 23.

The time base corrector is conventional and is adapted to remove jitter and other time base errors that may be present in the reproduced digital data. The output of the time base corrector is coupled to a deframing circuit 25 by way of an error checking and correction (ECC) circuit 24. The ECC circuit is adapted to correct errors that may be caused by minor defects in the record medium or that may be produced during the recording and/or reproducing operations. ECC circuitry and the operation of such circuits are known to those of ordinary skill in the art. If an error is not correctable by the ECC circuit, an error flag is set and further error correction is made by way of interpolators 30 and 32, as will be described.

Deframing circuit 25 is compatible with composing circuit 7 (FIG. 1) and is adapted to carry out an inverse operation. It will be appreciated that the deframing circuit thus converts the recovered bit rate, or data clock, from the frequency normally used for recording to a frequency used for video processing. In addition, the frame structure that had been used by framing circuit 9 to record the video data is reconverted back to block format. This block-formatted video data is coupled from deframing circuit 25 to block decoder 26 which is compatible with data compressor 8 and carries out an inverse operation. For example, if the data compressor functions to compress video data by means of discrete cosine transform, block decoder 26 implements an inverse discrete cosine transform operation. Similarly, if the data compressor carried out an adaptive dynamic range coding operation, the block decoder 25 implements an adaptive dynamic range decoding operation. It will be appreciated that the decoded output of block decoder 26 is substantially similar to the input of data compressor 8.

Distributor 27 is coupled to block decoder 26 and distributes the decoded video data into a luminance channel Y and color difference channels U and V. The luminance channel is coupled from distributor 27 to inverse blocking circuit 28 which functions to recover raster scan data from the image blocks that had been produced by image block converters 5 and 6 in the recording apparatus. Thus, block sequence data is decoded into a raster scanning sequence of data. It will be appreciated that inverse blocking circuit 28 thus recovers a raster scanning sequence of luminance data and inverse blocking circuit 29 recovers a raster scanning sequence of color difference data U and V.

Inverse blocking circuit 29 is coupled to distributor 31 which distributes the line sequential color difference signal data U and V to separate outputs which, in turn, are coupled to interpolator 32. Thus, interpolator 32 receives line sequential color difference data U and V and operates to correct errors therein that were not correctable by ECC circuit 24 and also operates to provide those raster lines of color difference data that had not been recorded. It is recalled that, in line sequential format, one line of color difference data U is followed by another line of color difference data V. Thus, alternate lines of color difference data are recorded in the line sequential format. Interpolator 32 supplies to output terminals 33U and 33V the original color difference data in successive lines. In addition, whereas line sequencer 4 had reduced the sampling rate of the color difference data signals to ½ the original data rate, interpolator 32 recovers the original sampling rate by multiplying the data rate of the color difference data signals U and V by the factor 2. Thus, color difference data samples are supplied to output terminals 33U and 33V at a sampling rate substantially equal to the original sampling rate of the color difference data signals U and V produced by information extractor 2.

Inverse blocking circuit 28 is coupled to interpolator 30 which operates to correct errors that were not correctable by ECC circuit 24. In addition, whereas frequency converter 3 of the recording apparatus shown in FIG. 1 reduced the sampling rate of luminance data signals Y to a sampling rate of ¾ their original rate, interpolator 30 recovers the original sampling rate by multiplying the data rate of the luminance signal data Y by the factor 4/3. Hence, interpolator 30 supplies to output terminal 33Y a digital luminance data signal whose clock rate is substantially the same as the clock rate of the digital luminance signal data Y produced by information extractor 2.

Channel decoder 22 also is coupled to an audio processor 62 which operates in either the high quality or after-recording mode to recover the original audio information that had been recorded in audio sectors 1 and 2 by the apparatus shown in FIG. 3. The recovered audio signals are supplied to output terminals 33A and 33B.

The video signal reproducing apparatus shown in FIG. 4 is known to those of ordinary skill in the art. Audio processor 62 is shown in greater detail in FIG. 5 and now will be described. The audio processor includes a time base corrector 48, an ID detector 63 and a processing circuit generally identified by the reference numeral B. Processing circuit B includes expanders 50, 51 and 52, interpolators 53, 54 and 55, digital-to-analog (D/A) converters 56, 57 and 58, a summing circuit 64 and a selector switch 59. Time base corrector 48 is coupled to channel decoder 22 to receive the decoded digital signals that had been encoded in the recording format determined by channel encoder 11. This time base corrector may be similar to time base corrector 23 (FIG. 4) and is adapted to remove jitter and other time base errors that may be present in the decoded audio signals. Time base corrector 48 is coupled to ID detector 63 and also to an error checking and correction (ECC) circuit 49.

The ID detector functions to detect the mode identifying data that had been added to the compressed audio data by ID/sync circuit 45 during a recording operation. Accordingly, ID detector 63 detects if the audio data is recorded in a high quality or after-recording mode of operation. As will be described, the ID detector controls selector switch 59 and also switch 60 as a function of the detected mode identifying data.

ECC circuit 49 is adapted to detect and correct errors in the compressed, digitized audio data that is reproduced from the record medium. The ECC circuit is conventional and, as is known by those of ordinary skill in the art, is adapted to set error flags in the recovered audio data if such data contains uncorrectable errors. As will be described, such errors nevertheless may be corrected or compensated by interpolators 53, 54 and 55. The output of ECC circuit 49 is coupled in common to expanders 50, 51 and 52.

It is recalled that the data rate of the digitized audio data is compressed for recording to a rate of 768 KB/sec. Expanders 50, 51 and 52 are adapted to return the data rate of this audio data to the original data rate of 1.536 MB/sec. Thus, the expanders function to multiply the data rate by a factor of two. Each expander is coupled to a respective interpolator 53, 54 and 55 which operates to carry out a conventional interpolating operation to correct or compensate for digitized audio data samples that were not correctable by ECC circuit 49. Thus, error compensation is carried out for those data samples whose error flags have been set.

The outputs of interpolators 53, 54 and 55 are coupled to D/A converters 56, 57 and 58, respectively. Each D/A converter serves to return the digitized audio data samples supplied thereto to analog form. The analog signals produced by D/A converters 56 and 57 are supplied to summing circuit 64 whose output is connected to a terminal a of selector switch 59. As illustrated, the output of D/A converter 56 is connected to terminal b of this selector switch. Selector switch 59 functions to couple to output terminal 33A either the summed analog audio signals produced by summing circuit 64 or the analog audio signal produced by D/A converter 56. D/A converter 58 is selectively coupled to output terminal 33B by switch 60.

The manner in which audio processor 62 operates now will be described. Let it be assumed that signals recorded in the form shown in FIG. 2 are reproduced from the record medium. Let it be further assumed that the audio signals were recorded in the high quality mode. Accordingly, and as discussed above, the mode identifying data recovered from audio sector 2 is detected by ID detector 63 as the high quality mode. Accordingly, ID detector 63 operates selector switch 69 to connect its terminal a to output terminal 33A and to open, or inhibit, switch 60.

The compressed, digitized audio data recovered from audio sectors 1 and 2 are time base corrected by time base corrector 48, subjected to error correction by ECC circuit 49 and supplied to expanders 50, 51 and 52. Since the output of expander 52 is coupled by way of interpolator 55 and D/A converter 58 to switch 60, and since this switch now is opened when audio data that had been recorded in the high quality mode is reproduced, the operation of expander 52 is not relevant to the present discussion.

Expanders 50 and 51 expand the compressed data rate of the digitized audio data recovered from audio sectors 1 and 2 from 768 KB/sec. to 1.536 MB/sec. Interpolators 53 and 54 compensate for errors in the audio data that were not correctable by ECC circuit 49, thus supplying error-corrected/compensated audio data recovered from audio sectors 1 and 2 to D/A converters 56 and 57. The outputs from these D/A converters are summed in summing circuit 64. Although not shown in FIG. 5, it will be appreciated that a delay circuit may be used to couple the analog audio signal from D/A converter 56 to summing circuit 64 with a delay substantially equal to the time needed to scan audio sector 1 during a playback operation. This delay results in the concurrent supply of the analog audio signals recovered from audio sectors 1 and 2.

When the embodiment shown in FIG. 3 is used for a high quality recording mode of operation, it is seen that the audio data recorded in audio sector 2 represents the difference, or error, between the compressed audio data that is recorded in audio sector 1 and the original audio data. During a reproducing operation, the analog audio signal supplied by expander 50, interpolator 53 and D/A converter 56 to summing circuit 64 corresponds to the compressed audio data that had been recorded in audio sector 1 and the analog audio signal supplied to this summing circuit by expander 51, interpolator 54 and D/A converter 57 corresponds to the aforementioned difference, or error. This difference or error is summed with the audio signal recovered from audio sector 1, thus correcting or compensating for quantizing errors and compression errors that may be present in the audio data recorded in audio sector 1. Hence, the output of summing circuit 64 is a high quality audio signal that is remarkably similar to the original input audio signal supplied to terminal 1A of the audio processor shown in FIG. 3. This recovered, high quality audio signal is coupled to output terminal 33A.

Now, let it be assumed that the compressed audio data recovered from audio sectors 1 and 2 had been recorded in the after-recording mode. Accordingly, ID detector 63 detects this mode identifying data and controls selector switch 59 to couple its terminal b to output terminal 33A and, moreover, closes, or activates, switch 60. Although not shown, it will be understood that, if desired, switch 60 is closed at a delayed time following the scanning of audio sector 1, that is, at the beginning of the scanning of audio sector 2. As will also be appreciated, an additional delay circuit may be coupled to the input of expander 50 to provide a delay equal to the time needed to scan audio sector 1 so that the audio signal recovered from audio sector 1 is supplied to output terminal 33A at the same time that the audio signal recovered from audio sector 2 is supplied to the output terminal 33B.

As before, when compressed, digitized audio data is recovered from audio sector 1, its data rate is expanded by expander 50 from 768 KB/sec. to 1.536 MB/sec., and errors that were not correctable by ECC circuit 49 are compensated by interpolator 53. The error-corrected/compensated audio data thus recovered from audio sector 1 is converted to analog form by D/A converter 56 and coupled by way of selector switch 59 to output terminal 33A. If desired, when operating in the after-recording mode, a suitable blocking circuit may be activated to block the output from selector switch 59 after the audio data reproduced from audio sector 1 is recovered.

When audio data is reproduced from audio sector 2, its data rate is expanded from 768 KB/sec. to 1.538 MB/sec. by expander 52; and errors included therein that were not correctable by ECC circuit 49 are compensated by interpolator 55. The error-corrected/compensated audio data is converted to analog form by D/A converter 58; and when switch 60 is closed, this analog audio signal recovered from audio sector 2 is coupled to output terminal 33B.

Thus, in the after-recording mode, analog information, such as a two-channel audio signal that had been recorded in audio sector 1, is reproduced at output terminal 33A, while a different two-channel audio signal that had been recorded in the after-recording mode in audio sector 2 is provided at output terminal 33B.

Figure 6:
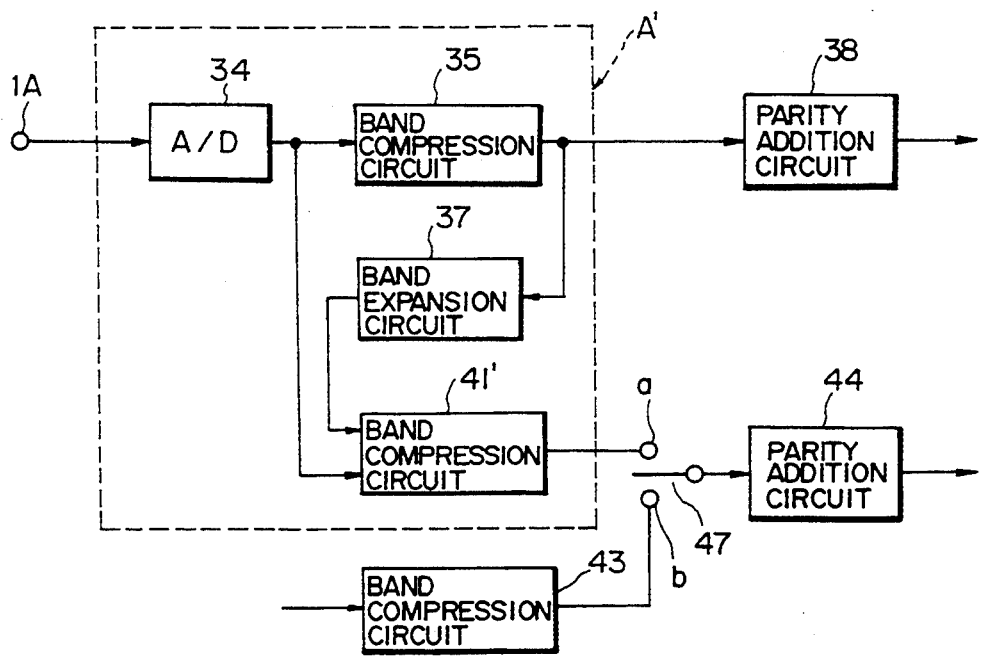
FIG. 6 is a block diagram of another embodiment of audio recording apparatus which incorporates the present invention.

Turning now to FIG. 6, there is illustrated another embodiment of high quality processing section A included in audio processor 15 of FIG. 3. This alternative embodiment is identified by reference numeral A'. In this alternative embodiment, a single A/D converter 34 is provided, the output of which is coupled to compressor 35 and also to a compressor 41'. The output of compressor 35 is coupled to expander 37, as in the FIG. 3 embodiment, but here, the output of expander 37 is coupled to compressor 41'. Compressor 35 and expander 37 may be substantially the same as shown in FIG. 3, and compressor 41' includes a digital difference circuit, or subtractor, by which the difference between the digitized audio signal produced by A/D converter 34 and the output of expander 37 is obtained. It is this difference which is compressed by compressor 41'.

As before, A/D converter 34 digitizes the audio signals supplied thereto to produce digitized audio data at the data rate of 1.536 MB/sec. Compressor 35 reduces the data rate by one-half, thus supplying compressed audio data at a 768 KB/sec. data rate to parity circuit 38. It is appreciated that the output of the parity circuit is recorded in audio sector 1.

Expander 37 returns the compressed audio data produced by compressor 35 to the original digitized data rate of 1.536 MB/sec. It is appreciated that the digitized audio data provided by this expander exhibits quantizing and compression errors. Accordingly, the difference circuit included in compressor 41' senses these errors by comparing the expanded digitized audio data from expander 37 to the digitized audio data supplied by A/D converter 34. To provide proper timing, a delay may be imparted to the digitized audio data supplied to compressor 41' by A/D converter 34.

Compressor 41' compresses the error between the expanded audio data from expander 37 and the digitized audio data from A/D converter 34 by reducing the data rate by one half. Hence, compressor 41' supplies to terminal a of selector switch 47 compressed error data at the 768 KB/sec. data rate. This compressed error data is coupled to parity circuit 44 and subsequently recorded in audio sector 2. Thus, the embodiment shown in FIG. 6 achieves substantially the same result as the embodiment shown in FIG. 3, but is implemented by a simpler circuit arrangement.

Figure 5:
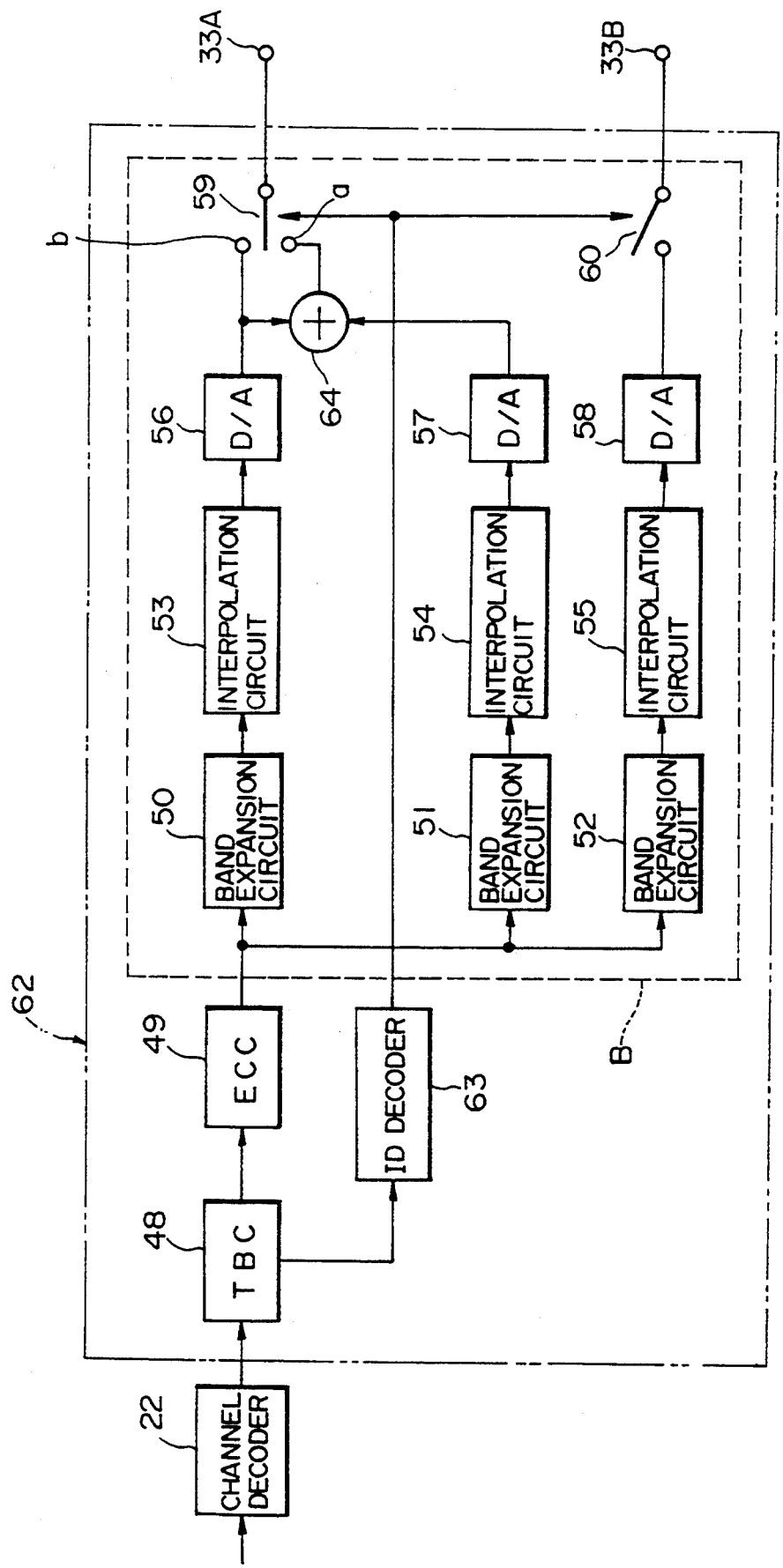
FIG. 5 is a block diagram of one embodiment of audio reproducing apparatus that is compatible with the recording apparatus shown in FIG. 3.
Figure 7:
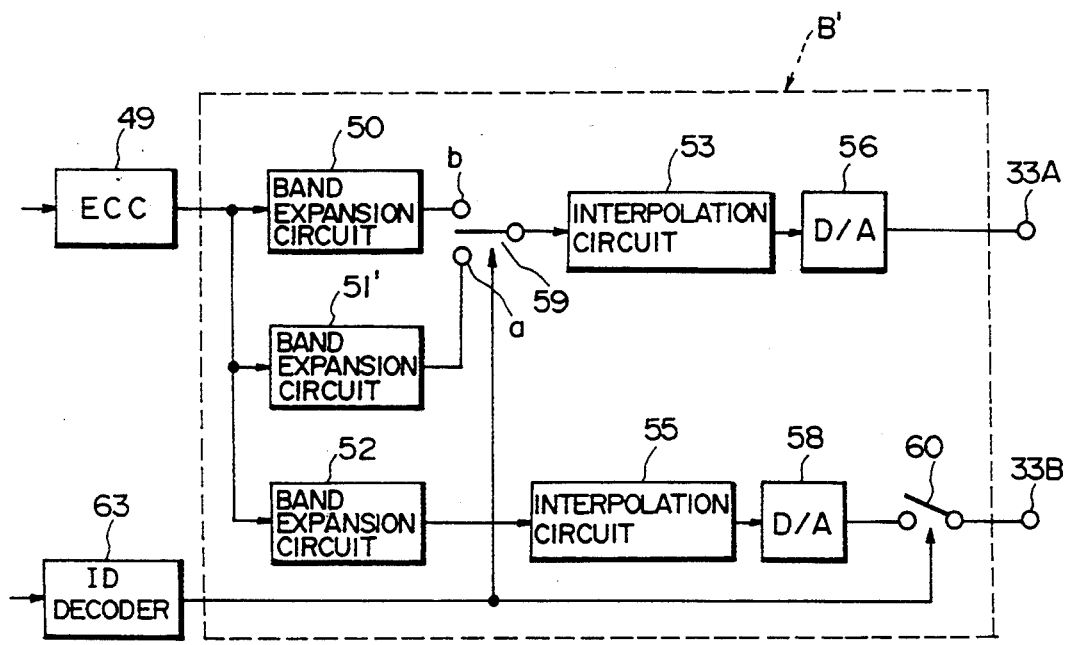
FIG. 7 is a block diagram of audio reproducing apparatus that is compatible with the embodiment shown in FIG. 6.

Turning now to FIG. 7, there is illustrated an alternative embodiment of the processing circuit B shown in FIG. 5, this alternative embodiment being particularly useful with the FIG. 6 embodiment of high quality processing section A'. As in the FIG. 5 embodiment, a selector switch 59 is controlled by ID detector 63 to engage its terminal a or terminal b. Here, however, selector switch 59 is coupled to interpolator 53. Terminal a is connected to the output of expander 51' and terminal b is connected to the output of expander 50. It will be appreciated that expander 50 in FIG. 7 is substantially the same as expander 50 in FIG. 5; and expander 51' in FIG. 7 comprises a modified version of expander 51 in FIG. 5. Processing circuit B' also includes expander 52, interpolator 55, D/A converter 58 and switch 60, all connected in cascade and all being similar to these same components discussed above in conjunction with FIG. 5.

Expander 51' is modified to the extent that it includes delay and summing circuits for delaying the digitized audio data recovered from audio sector 1 such that this delayed audio data is present substantially concurrently with the digitized audio data recovered from audio sector 2. It is appreciated that this delay can be triggered by sensing the audio sector 1 identifying data that is recorded with the compressed audio data.

When high quality identifying data is detected by ID detector 63, selector switch 59 connects terminal a to interpolator 53, thereby coupling the output of expander 51' to output terminal 33A. Now, when the digitized, compressed audio data is reproduced from audio sector 1, it is supplied to expander 51' whereat it is combined, or added, with the digitized audio data that is reproduced from audio sector 2. The aforementioned delay included in expander 51' provides proper timing between the audio data recovered from audio sectors 1 and 2.

After combining the audio data recovered from audio sectors 1 and 2, the data rate of the combined audio data is expanded from 768 KB/sec. to the original data rate of 1.536 MB/sec. This expanded audio data is coupled to interpolator 53 whereat errors that were not correctable by ECC circuit 49 are compensated. The resultant error-corrected/compensated audio data is converted to analog form by D/A converter 56 and supplied to output terminal 33A. Thus, when the processor is used to recover audio data that had been recorded in the high quality mode, the audio signals provided at output terminal 33A of processing circuit B' are substantially the same as the high quality audio signals coupled to output terminal 33A of processing circuit B (shown in FIG. 5).

It will be appreciated that if ID detector 63 detects the after-recording mode identifying data in the signals reproduced from the record medium by read heads 13A and 13B, selector switch 59 engages its terminal b and switch 60 is closed. Accordingly, audio data recovered from audio sector 1 is expanded from its data rate of 768 KB/sec. to its original data rate of 1.536 MB/sec. by expander 50, and this expanded audio data is interpolated by interpolator 53, converted to analog form by D/A converter 56 and supplied to output terminal 33A. Likewise, audio data that is recovered from audio sector 2 is expanded from its data rate of 768 KB/sec. to its original data rate of 1.536 MB/sec. by expander 52; and this expanded audio data is interpolated by interpolator 55, converted to analog form by D/A converter 58 and coupled by switch 60 to output terminal 33B. Thus, it is seen that the two-channel audio information that had been supplied for recording at the same time as the video information is provided at output terminal 33A, and after-recorded two-channel audio information is provided at output terminal 33B.

It is recalled that, in addition to recording mode identifying data, sector identification data also is recorded in, for example, the preamble of each of audio sectors 1 and 2. If desired, expanders 50 and 52 may include sector ID detectors which are adapted to enable the respective expanders upon detecting the corresponding sector identification. Thus, when audio sector 1 is scanned during a reproducing operation, sector 1 ID data enables expander 50 to expand the audio data recovered from audio sector 1 and sector 2 ID data enables expander 52 to expand the audio data recovered from audio sector 2. In addition, and if further desired, the inherent delay in scanning audio sector 2 after audio sector 1 is scanned may be compensated by providing a compensating delay circuit in expander 50.

Figure 8:
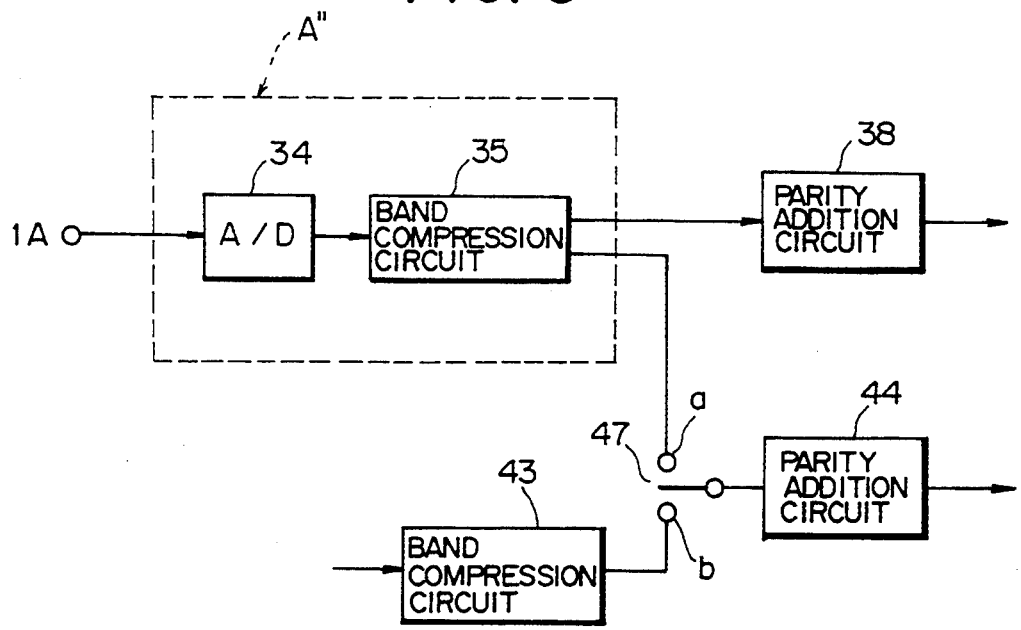
FIG. 8 is a block diagram of yet another embodiment of audio recording apparatus which incorporates the present invention.

Yet another embodiment of high quality processing section A of audio processor 15 is illustrated as section A" in FIG. 8. It is seen that this embodiment of high quality processing section A" admits of a relatively simple construction including A/D converter 34 whose output is coupled to a compressor 35'. Compressor 35' may be similar to aforedescribed 35 (shown in FIG. 3) and includes two outputs, one coupled to parity circuit 38 and the other coupled by way of selector switch 47 to parity circuit 44.

Compressor 35' is adapted to compress the data rate of those digitized audio signals which are supplied for recording at the same time as the video signals. As before, this data rate is reduced from 1.536 MB/sec. to 768 KB/sec. The compressor produces substantially identical compressed audio data at its outputs, thereby supplying redundant audio data to parity circuit 38 and, by way of terminal a of selector switch 47, to parity circuit 44. The output of parity circuit 38, after having sector ID and block sync signals added thereto, is recorded in audio sector 1; and the output of parity circuit 44 is recorded in audio sector 2. Since redundant audio data is recorded in audio sectors 1 and 2, errors that may be present in the audio data recovered from one sector, as may be caused by dropout, are compensated by switching to the redundant audio data that is recovered from the other sector. This will be described in greater detail below.

It will be appreciated that, when the apparatus shown in FIG. 8 operates in its after-recording mode, selector switch 47 is coupled to terminal b such that audio signals which are supplied to input terminal 1B are digitized, compressed by compressor 43 and coupled by way of the selector switch and parity circuit 44, ID/-sync circuit 45, multiplexer 46 and mixer 14 to be recorded in audio sector 2. Thus, as was the case with the embodiment shown in FIG. 3, after-recorded audio data is compressed and recorded in audio sector 2.

Figure 9:
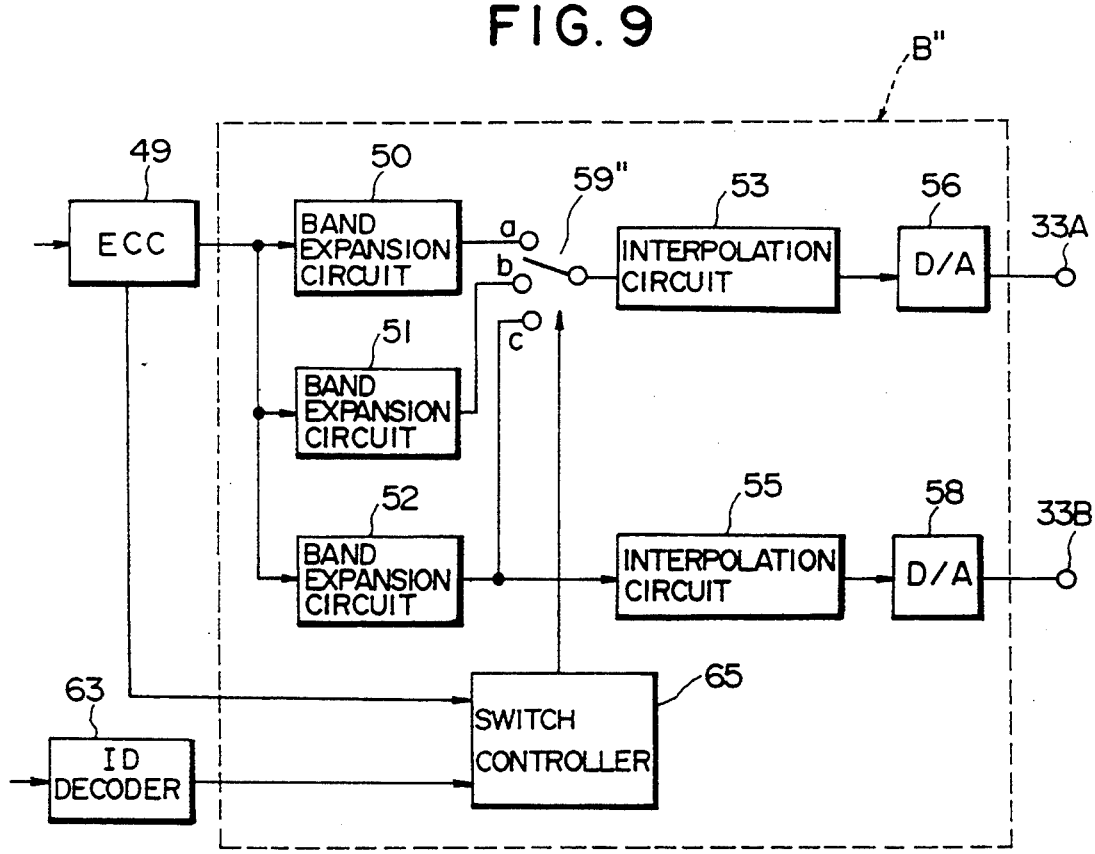
FIG. 9 is a block diagram of audio reproducing apparatus that is compatible with the embodiment shown in FIG. 8.

An embodiment of processing circuit B″ that is compatible with high quality processing section A″ and is adapted to recover audio data that had been recorded in the high quality or after-recording modes is illustrated in FIG. 9. As shown, the output of ECC circuit 49 is connected in common to expanders 50, 51 and 52, and the output of each of these expanders is connected to a respective terminal a, b and c of a selector switch 59″. This selector switch is controlled by a switch controller 65 having inputs coupled to ID detector 63 and ECC circuit 49, respectively. The output of selector switch 59″ is coupled to D/A converter 56 by way of interpolator 53; and the output of expander 52 is coupled to D/A converter 58 by way of interpolator 55. As in the FIG. 5 embodiment, D/A converters 56 and 58 are connected to output terminals 33A and 33B, respectively.

In operation, let it be assumed that ID detector 63 detects mode identifying data representing the high quality mode. The ID detector thus controls switch controller 65 to connect selector switch 59″ to its terminal a. When audio sector 1 is scanned, the compressed audio data recorded therein is reproduced, error-corrected by ECC circuit 49 and expanded by expander 50 from its recorded data rate of 768 KB/sec. to its original data rate of 1.536 MB/sec. The audio data of restored data rate is interpolated by interpolator 53, converted to analog form by D/A converter 56 and supplied to output terminal 33A.

In the event that the audio data recovered from audio sector 1 includes an error that cannot be corrected by ECC circuit 49, an error indication is supplied from the ECC circuit to switch controller 65. In response thereto, the switch controller connects selector switch 59″ to its terminal c, thereby coupling expander 52 to interpolator 53. It is recalled that expander 52 operates to expand the data rate of the compressed audio data that is recovered from audio sector 2. For example, and as mentioned above, expander 52 may include a sector ID detector for detecting the sector identification data that is recorded in, for example, the preamble of the audio sectors. When sector 2 identification data is detected, expander 52 operates to expand the data rate of the reproduced audio data from 768 KB/sec. to 1.536 MB/sec. Thus, when errors such as drop-out errors are present in the audio data reproduced from audio sector 1, selector switch 59″ couples the redundant audio data reproduced from audio sector 2 to interpolator 53, D/A converter 56 and output terminal 33A. Hence, high quality audio reproduction is assured.

It will be recognized that, if desired, a delay circuit may be included in expander 50, or may be connected at the input thereof, to provide proper timing synchronization between the audio data reproduced from audio sector 1 and the audio data reproduced from audio sector 2. Since the audio data recorded in these audio sectors is redundant, a change over of selector switch 59″ from terminal a to terminal c does not result in any loss of information. Errors that otherwise would prevent the reproduced audio data from being recovered accurately thus are compensated by changing over the particular expander whose output is coupled to output terminal 33A.

If, while recovering audio data from audio sector 2 an error is present therein which cannot be corrected by ECC circuit 49, a suitable error indication is supplied therefrom to switch controller 65 which now changes over selector switch 59″ to its terminal b. Accordingly, expander 51 is coupled by selector switch 59″ to output terminal 33A via interpolator 53 and D/A converter 56 and audio data recovered from audio sector 1 thus is supplied as analog audio signals to output terminal 33A. Hence, if an error is present in the audio data reproduced from sector 2, that audio data is replaced by the redundant audio data reproduced from audio sector 1 so as to assure the high quality reproduction of audio information.

Expander 51 may include a sector ID detector which, upon detecting audio sector 1 identification data, enables the operation of the expander. In addition, a delay circuit may be provided at, for example, the input to expander 51 so as to compensate for inherent delays between the audio data that is reproduced from audio sector 1 and the audio data that is reproduced from audio sector 2. By compensating for such delays, the outputs of expanders 51 and 52 are substantially identical at any given period of time. Thus, an error that may be present in audio data recovered from one sector is compensated by substituting the same audio data that is recovered from the other sector.

When ID detector 63 detects the mode identifying data representing the after-recording mode, switch controller 65 connects selector switch 59″ to, for example, terminal a. Thus, the audio data which is reproduced from audio sector 1 is expanded by expander 50 and coupled through the selector switch to output terminal 33A by way of interpolator 53 and D/A converter 56. Also, audio data that is reproduced from audio sector 2 is expanded by expander 52 and coupled to output terminal 33B by way of interpolator 55 and D/A converter 58. Hence, the after-recorded audio data that had been recorded in audio sector 2 is provided at output terminal 33B, as was the case for the embodiments discussed above in connection with FIGS. 5 and 7.

It will be recognized that, although switch controller 65 connects selector switch 59″ to its terminal a for the recovery of audio data from audio sector 1 in the after-recording mode, substantially the same result is achieved if the selector switch is connected to its terminal b.

Figure 10:
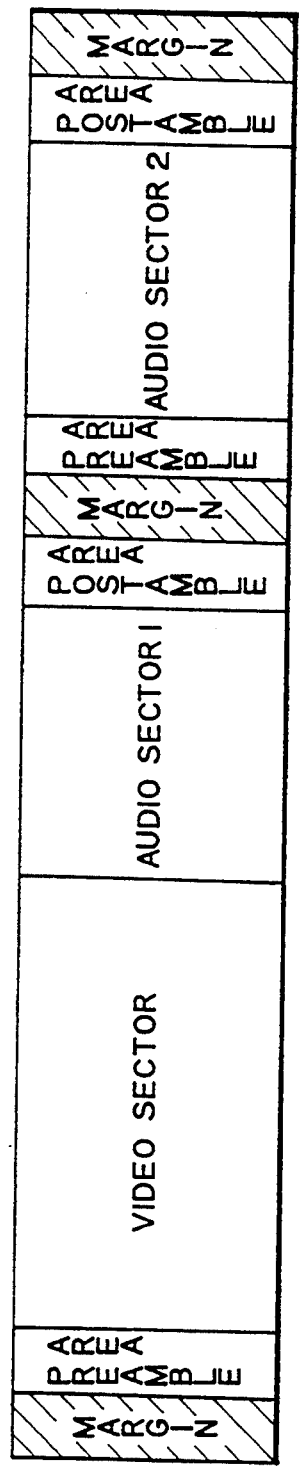
FIG. 10 is a schematic representation of yet another segment in which video and audio data are recorded in accordance with the present invention.

In the embodiments described herein, the video and audio data are recorded in a segment of the type shown schematically in FIG. 2. In this FIG. 2 format, audio sector 1 is separated from the video sector by postamble, margin and preamble areas. An alternative format of a segment that may be recorded by the present invention is illustrated in FIG. 10, wherein audio sector 1 may be thought of as being an extension of the video sector. That is, audio sector 1 simply follows the video sector and is not spaced therefrom by a postamble area, a margin area or a preamble area. By eliminating these non-data areas, the available room for recording useful information, such as video or audio data, is enlarged. Alternatively, if the same amount of video and audio data is recorded in a segment, the overall length of that segment and, thus, the overall length of a track, may be reduced. Hence, the recording density of the format shown in FIG. 10 is greater than that of the format shown in FIG. 2.

While the present invention has been particularly shown and described with reference to preferred embodiments, it will be readily appreciated by those of ordinary skill in the art that various changes and modifications may be made without departing from the spirit and scope of the invention. For example, the different recording modes with which the present invention operates need not be limited solely to high quality and after-recording modes. Also, although each audio sector has been described as having two-channel audio data recorded therein, it will be appreciated that the audio data may be recorded as single channel data. Still further, it will be recognized that in the various embodiments of the audio data reproducing apparatus, selected delays may be used if time coincidence between the audio data recovered from audio sector 1 and audio data recovered from audio sector 2 is desired. Some of these delays have been described above and others will become readily apparent to those of ordinary skill in the art.

Therefore, it is intended that the appended claims be interpreted as covering the embodiments specifically disclosed herein, those various modifications and alternatives which have been discussed above, and all equivalents thereto.

What is claimed is:

1. A method of recording video and audio data onto video and audio signal recording areas of a track of a record medium, said method including the steps of:
   compressing audio data that is supplied at substantially the same time as the video data;
   recording said compressed audio data in a first audio sector of said audio signal recording area;
   selecting a first or second audio signal recording mode;
   selectively providing derived compressed audio data that is derived from the audio data supplied at substantially the same time as the video data when said first audio signal recording mode is selected by determining an error in said compressed audio data and supplying the determined error as said derived compressed audio data, and selectively providing independent compressed audio data when said second audio signal recording mode is selected; and
   recording the provided derived compressed audio data in a second audio sector of said audio signal recording area when said first audio signal recording mode is selected and recording the provided independent compressed audio data in said second audio sector of said audio signal recording area when said second audio signal recording mode is selected.

2. The method of claim 1 wherein said video and audio signal recording areas are included in one of a plurality of recording segments in said track.

3. The method of claim 1 wherein said step of selectively providing derived compressed audio data further comprises compressing said determined error.

4. A method of recording video and audio data onto video and audio signal recording areas of a track of a record medium, said method including the steps of:
   digitizing input analog audio data that is supplied at substantially the same time as the video data;
   compressing the digitized audio data;
   recording said compressed audio data in a first audio sector of said audio signal recording area;
   selecting a first or second audio signal recording mode;
   selectively providing derived compressed audio data that is derived from the audio data supplied at substantially the same time as the video data when said first audio signal recording mode is selected by determining an error in said compressed audio data, said error being determined by expanding the compressed, digitized audio data, converting the expanded digitized audio data to analog form, determining a difference between the converted analog audio data and the input analog audio data, digitizing the determined difference, compressing said determined difference and supplying said compressed determined difference as said derived compressed audio data;
   selectively providing independent compressed audio data when said second audio signal recording mode is selected; and
   recording said derived compressed audio data in a second audio sector of said audio signal recording area when said first audio signal recording mode is selected and recording said provided independent compressed audio data in said second audio sector of said audio signal recording area when said second audio signal recording mode is selected.

5. A method of recording video and audio data onto video and audio signal recording areas of a track of a record medium, said method including the steps of:
   compressing audio data that is supplied at substantially the same time as the video data by digitizing input analog audio data and compressing the digitized input audio data;
   recording said compressed audio data in a first audio sector of said audio signal recording area;
   selecting a first or second audio signal recording mode;
   selectively providing derived compressed audio data that is derived from the audio data supplied at substantially the same time as the video data when said first audio signal recording mode is selected by determining an error in the compressed audio data by expanding the compressed audio data, determining a difference between the expanded audio data and said digitized input audio data and compressing said difference, and supplying said compressed difference as said derived compressed audio data;
   selectively providing independent compressed audio data when said second audio signal recording mode is selected; and
   recording said derived compressed audio data in a second audio sector of said audio signal recording area when said first audio signal recording mode is selected and recording said provided independent compressed audio data in said second audio sector of said audio signal recording area when said second audio signal recording mode is selected.

6. A method of recording video and audio data onto video and audio signal recording areas of a track of a record medium, said method including the steps of:

compressing audio data that is supplied at substantially the same time as the video data;

recording said compressed audio data in a first audio sector of said audio signal recording area;

selecting a first or second audio signal recording mode;

selectively providing derived compressed audio data that is derived from the audio data supplied at substantially the same time as the video data when said first audio signal recording mode is selected by supplying as said derived compressed audio data the same said compressed audio data recorded in said first audio sector, and selectively providing independent compressed audio data when said second audio signal recording mode is selected; and recording the provided derived compressed audio data in a second audio sector of said audio signal recording area when said first audio signal recording mode is selected, whereby redundant compressed audio data is recorded in both said first and second audio sectors, and recording the provided independent compressed audio data in said second audio sector of said audio signal recording area when said second audio signal recording mode is selected.

7. The method of claim 1 or 6 wherein said first audio signal recording mode is a high quality recording mode and said second audio signal recording mode is an after-recording mode.

8. The method of claim 7 wherein said independent compressed audio data is provided for recording at a time subsequent to the recording of said video data.

9. The method of claim 1 or 6 wherein said first audio sector is located adjacent said video signal recording area.

10. The method of claim 1 or 6 further comprising the step of recording a mode identifying signal with said audio data to identify the audio signal recording mode that has been selected.

11. The method of claim 10 wherein said mode identifying signal is recorded in said second audio sector with said derived or independent compressed audio data.

12. A method of reproducing video and audio data from video and audio signal recording areas of a track of a record medium, said audio data being recorded as compressed audio data in a first audio sector and, depending upon the recording mode used to record the audio data, audio data is selectively recorded in a second audio sector as derived compressed audio data that is derived from the audio data in said first audio sector or as independent compressed audio data, said method comprising the steps of:

scanning said video and audio signal recording areas to recover video and audio data, respectively;

separating the recovered audio data from said video data;

sensing the recording mode that was used to record the audio data;

expanding the compressed audio data recovered from said first and second audio sectors;

combining the expanded audio data recovered from said first and second audio sectors to produce an output audio signal when a first recording mode is sensed; and supplying the expanded audio data recovered from said first and second audio sectors as separate output audio signals when a second recording mode is sensed.

13. The method of claim 12 wherein a recording mode identifying signal is recorded in at least one of said first and second audio sectors, and said step of sensing the recording mode comprises reproducing said identifying signal and detecting the reproduced identifying signal.

14. The method of claim 12 wherein said derived compressed audio data that is recorded in said second audio sector in a first recording mode comprises compressed error data that is derived from a difference between the compressed audio data that is recorded in said first audio sector and audio data originally supplied for recording; and said step of combining comprises error correcting the expanded audio data recovered from said first and second audio sectors, converting the error-corrected audio data recovered from said first and second audio sectors to analog signal form, and summing the analog audio signals recovered from said first and second audio sectors to produce an output analog audio signal.

15. The method of claim 12 wherein said derived compressed audio data that is recorded in said second audio sector in a first recording mode comprises compressed error data that is derived from a difference between the compressed audio data that is recorded in said first audio sector and audio data originally supplied for recording; and said step of combining comprises summing the expanded audio data recovered from said first and second audio sectors, error correcting the summed audio data, and converting the error-corrected, summed audio data to analog signal form to produce an output analog audio signal.

16. The method of claim 12 wherein said derived compressed audio data that is recorded in said second audio sector in a first recording mode comprises the same compressed audio data that is recorded in said first audio sector; and said step of combining comprises selecting the expanded audio data recovered from one of said audio sectors, sensing an error in the selected audio data, and changing over the selection of expanded audio data recovered from one to the other of said audio sectors when an error is sensed.

17. The method of claim 12 wherein said first recording mode is a high quality recording mode and said second recording mode is an after-recording mode.

18. The method of claim 17 wherein the independent compressed audio data that is recorded in said second audio sector comprises two-channel audio data independent of the compressed audio data that is recorded in said first audio sector.

19. The method of claim 17 wherein the compressed audio data that is recorded in said first audio sector comprises two-channel audio data that is recorded at substantially the same time as the video data.

20. The method of claim 12 wherein said first audio sector is located adjacent said video signal recording area.

21. The method of claim 12 wherein said video and audio signal recording areas are included in one of a plurality of recording segments in a track.

22. Audio recording apparatus for use in a system which records video and audio data onto video and audio signal recording areas of a track of a record medium, said apparatus comprising:

compression means for compressing audio data that is supplied for recording at substantially the same time as the video data;

first recording means for recording said compressed audio data in a first audio sector of said audio signal recording area;

mode selecting means for selecting a first or second audio signal recording mode;

audio data selection means for selectively providing derived compressed audio data that is derived from the audio data supplied for recording at substantially the same time as the video data when said first audio signal recording mode is selected, said audio data selection means including error determining means coupled to said compression means for determining an error in said compressed audio data and supplying the determined error as said derived compressed audio data, and for selectively providing independent compressed audio data when said second audio signal recording mode is selected; and second recording means coupled to said audio data selection means for recording the provided derived compressed audio data in a second audio sector of said audio signal recording area when said first audio signal recording mode is selected and for recording the provided independent compressed audio data in said second audio sector of said audio signal recording area when said second audio signal recording mode is selected.

23. The apparatus of claim 22 wherein said video and audio signal recording areas are included in one of a plurality of recording segments in said track.

24. The apparatus of claim 22 wherein said audio data selection means further comprises second compression means for compressing said determined error.

25. Audio recording apparatus for use in a system which records video and audio data onto video and audio signal recording areas of a track of a record medium, said apparatus comprising:

A/D means for digitizing input analog audio data that is supplied for recording at substantially the same time as the video data;

first compression means for compressing the digitized audio data;

first recording means for recording said compressed audio data in a first audio sector of said audio signal recording area;

mode selecting means for selecting a first or second audio signal recording mode;

audio data selection means for selectively providing derived compressed audio data that is derived from the audio data supplied for recording at substantially the same time as the video data when said first audio signal recording mode is selected and including error determining means coupled to said first compression means for determining an error in said compressed digitized audio data, said error determining means comprising means for expanding the compressed, digitized audio data, D/A means for converting the expanded digitized audio data to analog form, difference means for determining a difference between the analog audio data from said D/A means and the input analog audio data, and additional A/D means for digitizing the difference from said difference means, and second compression means for compressing said digitized difference, said audio data selection means selectively providing independent compressed audio data when said second audio signal recording mode is selected; and second recording means coupled to said audio data selection means for recording said compressed digitized difference in a second audio sector of said audio signal recording area when said first audio signal recording mode is selected and for recording said provided independent compressed audio data in said second audio sector of said audio signal recording area when said second audio signal recording mode is selected.

26. Audio recording apparatus for use in a system which records video and audio data onto video and audio signal recording areas of a track of a record medium, said apparatus comprising:

first compression means for compressing audio data that is supplied for recording at substantially the same time as the video data and including A/D means for digitizing input analog audio data and first compressor means for compressing the digitized audio data;

first recording means for recording said compressed digitized audio data in a first audio sector of said audio signal recording area;

mode selecting means for selecting a first or second audio signal recording mode;

audio data selection means for selectively providing derived compressed audio data that is derived from the audio data supplied for recording at substantially the same time as the video data when said first audio signal recording mode is selected and including error determining means comprising expansion means coupled to said first compressor means for expanding the compressed audio data, and means for determining a difference between the expanded audio data from said expansion means and said digitized audio data from said A/D means, and second compression means for compressing said determined difference, said audio data selection means selectively providing independent compressed audio data when said second audio signal recording mode is selected; and second recording means coupled to said audio data selection means for recording said compressed determined difference in a second audio sector of said audio signal recording area when said first audio signal recording mode is selected and for recording said provided independent compressed audio data in said second audio sector of said audio signal recording area when said second audio signal recording mode is selected.

27. Audio recording apparatus for use in a system which records video and audio data onto video and audio signal recording areas of a track of a record medium, said apparatus comprising:

compression means for compressing audio data that is supplied for recording at substantially the same time as the video data;

first recording means for recording said compressed audio data in a first audio sector of said audio signal recording area;

mode selecting means for selecting a first or second audio signal recording mode;

audio data selection means for selectively providing derived compressed audio data that is derived from the audio data supplied for recording at substantially the same time as the video data when said first audio signal recording mode is selected and including switch means coupled to said compression means for supplying the same said compressed audio data recorded in said first audio sector as said derived compressed audio data, and for selectively providing independent compressed audio data when said second audio signal recording mode is selected; and second recording means coupled to said audio data selection means for recording the provided derived compressed audio data in a second audio sector of said audio signal recording area when said first audio signal recording mode is selected, whereby redundant compressed audio data is recorded in both said first and second audio sectors, and for recording the provided independent compressed audio data in said second audio sector of said audio signal recording area when said second audio signal recording mode is selected.

28. The apparatus of claim 22 or 27 wherein said first audio signal recording mode is a high quality recording mode and said second audio signal recording mode is an after-recording mode.

29. The apparatus of claim 28 wherein said independent compressed audio data is provided for recording at a time subsequent to the recording of said video data.

30. The apparatus of claim 22 or 27 wherein said first audio sector is located adjacent said video signal recording area.

31. The apparatus of claim 22 or 27 further comprising ID means for generating a mode identifying signal for recording with said audio data to identify the audio signal recording mode that has been selected.

32. The apparatus of claim 31 wherein said ID means is coupled to said second recording means for recording in said second audio sector with said derived or independent compressed audio data.

33. Apparatus for reproducing video and audio data from video and audio signal recording areas of a track of a record medium, said audio data having been recorded as compressed audio data in a first audio sector and, depending upon the recording mode that was used to record the audio data, said audio data also having been selectively recorded in a second audio sector as derived compressed audio data that is derived from the audio data in said first audio sector or that is independent compressed audio data, said apparatus comprising:

means for scanning said video and audio signal recording areas to recover video and audio data, respectively;

separating means for separating the recovered audio data from said video data;

mode sense means coupled to receive the recovered audio data for sensing the recording mode that was used to record the audio data;

expanding means coupled to said separating means for expanding the compressed audio data recovered from said first and second audio sectors;

combining means for combining the expanded audio data recovered from said first and second audio sectors to produce an output audio signal when a first recording mode is sensed; and means for supplying the expanded audio data recovered from said first and second audio sectors as separate output audio signals when a second recording mode is sensed.

34. The apparatus of claim 33 wherein a recording mode identifying signal is recorded in at least one of said first and second audio sectors, and said mode sense means comprises means for detecting the identifying signal in the data recovered from said at least one audio sector.

35. The apparatus of claim 33 wherein said derived compressed audio data that has been recorded in said second audio sector comprises compressed error data derived from a difference between the compressed audio data that was recorded in said first audio sector and audio data originally supplied for recording; and said combining means comprises error correcting means for error correcting the audio data expanded by said expanding means, D/A means for converting the error-corrected audio data recovered from said first and second audio sectors to analog signal form, and means for summing the analog audio signals recovered from said first and second audio sectors to produce an output analog audio signal.

36. The apparatus of claim 33 wherein said derived compressed audio data that has been recorded in said second audio sector comprises compressed error data derived from a difference between the compressed audio data that was recorded in said first audio sector and audio data originally supplied for recording; and said combining means comprises means for summing the expanded audio data recovered from said first and second audio sectors, error correcting means for error correcting the summed audio data, and D/A means for converting the error-corrected, summed audio data to analog signal form to produce an output analog audio signal.

37. The apparatus of claim 33 wherein said derived compressed audio data that has been recorded in said second audio sector comprises the same compressed audio data that was recorded in said first audio sector; and said combining means comprises selector means for selecting the expanded audio data recovered from one of said audio sectors, error sense means for sensing an error in the selected audio data, and change-over means for changing over the selection of expanded audio data recovered from one to the other of said audio sectors when an error is sensed.

38. The apparatus of claim 33 wherein said first recording mode is a high quality recording mode and said second recording mode is an after-recording mode.

39. The apparatus of claim 38 wherein the independent compressed audio data that was recorded in said second audio sector comprises two-channel audio data independent of the compressed audio data that was recorded in said first audio sector.

40. The apparatus of claim 38 wherein the compressed audio data that was recorded in said first audio sector comprises two-channel audio data that was recorded at substantially the same time as the video data.

41. The apparatus of claim 33 wherein said first audio sector is located adjacent said video signal recording area.

42. The apparatus of claim 33 wherein said video and audio signal recording areas are included in one of a plurality of recording segments in a track.

* * * * *